(12) United States Patent
Mickael

(10) Patent No.: US 8,797,825 B2
(45) Date of Patent: Aug. 5, 2014

(54) METHOD AND APPARATUS FOR MEASURING FORMATION ANISOTROPY WHILE DRILLING

(75) Inventor: Medhat W. Mickael, Sugar Land, TX (US)

(73) Assignee: Precision Energy Services, Inc., Fort Worth, TX (US)

( * ) Notice: Subject to any disclaimer, the term of this patent is extended or adjusted under 35 U.S.C. 154(b) by 330 days.

(21) Appl. No.: 12/848,430

(22) Filed: Aug. 2, 2010

(65) Prior Publication Data

US 2012/0026831 A1 Feb. 2, 2012

(51) Int. Cl.
*G01V 1/00* (2006.01)
*G01V 1/52* (2006.01)
*G01V 1/48* (2006.01)

(52) U.S. Cl.
CPC .... *G01V 1/52* (2013.01); *G01V 1/48* (2013.01)
USPC .............................................. 367/31; 367/25

(58) Field of Classification Search
USPC ....................................... 367/31, 25
See application file for complete search history.

(56) References Cited

U.S. PATENT DOCUMENTS

| | | | |
|---|---|---|---|
| 5,311,484 A | 5/1994 | Anderson et al. | |
| 5,343,441 A | 8/1994 | Alford | |
| 5,678,643 A | 10/1997 | Robbins et al. | |
| 5,808,963 A | 9/1998 | Esmersoy | |
| 6,098,021 A | 8/2000 | Tang | |
| 6,188,961 B1 | 2/2001 | Mandal | |
| 6,714,480 B2 | 3/2004 | Sinha | |
| 6,718,266 B1 | 4/2004 | Sinha | |
| 6,930,616 B2 | 8/2005 | Tang | |
| 7,310,285 B2 | 12/2007 | Donald | |
| 7,623,412 B2 | 11/2009 | Pabon et al. | |
| 7,646,674 B2 | 1/2010 | Yogeswaren | |
| 2004/0249573 A1* | 12/2004 | McElhinney | 702/7 |
| 2007/0140055 A1 | 6/2007 | Tello et al. | |
| 2008/0170466 A1 | 7/2008 | Mickael | |
| 2009/0185446 A1 | 7/2009 | Zheng et al. | |

FOREIGN PATENT DOCUMENTS

WO 2009124115 A2 10/2009

OTHER PUBLICATIONS

Examiner's first report received in corresponding Australian patent application No. 2011204827, mail date May 22, 2012.
Search report received in corresponding PCT patent application No. PCT//US2009/039101, dated Jun. 8, 2009.
Search report received in corresponding European patent application No. 11 17 4366, dated Dec. 18, 2012.

* cited by examiner

*Primary Examiner* — Isam Alsomiri
*Assistant Examiner* — James Hulka
(74) *Attorney, Agent, or Firm* — Wong, Cabello, Lutsch, Rutherford & Brucculeri LLP

(57) ABSTRACT

A logging system for measuring anisotrophic properties of the materials penetrated by a borehole. A downhole or "logging tool" element of the system comprises a source section that comprises either a unipole or a dipole acoustic source. The receiver section comprises a plurality of receiver stations disposed at different axial spacings from the acoustic source. Each receiver station comprises one or more acoustic receivers. The system requires that the source and receiver sections rotate synchronously as the logging tool is conveyed along the borehole. Receiver responses are measured in a plurality of azimuthal angle segments and processed as a function of rotation angle of the tool. The logging system can be embodied as a logging-while-drilling system, a measurement-while-drilling system, and a wireline system that synchronously rotates source and receiver sections. All embodiments require that the acoustic source operate at a relatively high frequency.

19 Claims, 9 Drawing Sheets

METHOD AND APPARATUS FOR MEASURING FORMATION ANISOTROPY WHILE DRILLING

FIELD OF THE INVENTION

This invention is related to systems for measuring one or more acoustic properties of material penetrated by a well borehole. More particularly, the invention is related to measuring anisotrophic properties of the material using unipole and dipole acoustic sources. Anisotropic measurements are used in a variety of geophysical applications.

BACKGROUND

Acoustic logging systems are routinely used in the oil and gas industry to measure formation acoustic properties of earth formation penetrated by a well borehole. These properties include the compressional and shear velocities of the formation, which are subsequently used to determine a variety of formation parameters of interest including, but not limited to; porosity, lithology, density and pore pressure. Additionally, acoustic logging systems are used to produce acoustic images of the borehole from which well conditions and other geological features can be investigated. Other applications of acoustic logging measurements include seismic correlation and rock mechanic determination.

The above mentioned acoustic measurements typically need to be corrected for any formation anisotrophic effects before parameters of interest can be determined from the measured parameters. Furthermore, anisotrophy parameters are themselves parameters of interest, and are used in a variety of geophysical applications including cross-well seismic measurements, convention seismic interpretations, and the like. Elastic anisotropy manifests itself as the directional dependence of sound speed in earth formation. Anisotropy in earth formation may be due to intrinsic microstructure, such as the case in shales, or may be due to mesostructure, such as fractures, or may be due to macrostructure such as layering due to sedimentation. Whatever the cause for anisotropy may be, good estimates of elastic properties of anisotropic media are required in resolving seismic images accurately, in interpreting borehole logs and in estimating drilling mechanics parameters.

Most formations have anisotropic structure resulting from layering, micro fractures, or orientation of mineral deposits in a certain direction. This internal stress causes the shear velocity to vary with propagation direction. Transverse isotropy (TI) is commonly used to model formation anisotropy. One example of TI anisotropy is horizontal transverse isotropy (HTI) where the axis of anisotropic symmetry is horizontal. Another example of TI anisotropy is vertical transverse isotropy, where the axis of anisotropic symmetry is vertical. Specific examples of these TI anisotropy formations are vertical fracturing along the borehole axis and horizontal bedding planes in a vertical well.

Formation anisotropy can be determined with acoustic logging-while-drilling (LWD) or measurement-while-drilling (MWD) systems. Formation anisotropy can also be determined with acoustic wireline systems after the borehole drilling operation is complete. MWD, LWD, and wireline acoustic logging systems comprising monopole and dipole acoustic sources have been used in the prior art as shown, for example, in U.S. Pat. Nos. 7,623,412 B2, 5,808,963, 6,714,480 B2, 7,310,285 B2, 7,646,674 B2, which are incorporated herein by reference. There are operational and environment factors that limit practical source frequencies, especially in MWD and LWD systems. This topic will be discussed in detail in subsequent sections of this disclosure.

SUMMARY OF THE INVENTION

This invention is based upon anisotropic formation modeling and acoustic logging system tool response modeling in anisotropic formations. The invention can be embodied as a MWD, LWD or wireline logging system. Hereafter, all systems that measure parameters of interest while drilling will be referred to as "LWD" systems, although it should be understood the invention can also be embodied as a MWD system. LWD and wireline logging systems comprising a unipole or alternately a dipole acoustic source are developed from the modeling. The borehole instrument or "logging tool" comprises a source section and a receiver section. The source section comprises a source of acoustic energy operated at a frequency of approximately 4 kilohertz (KHz) or greater for the LWD or MWD tool and 1 KHz or greater for the wireline tool. The receiver section comprises a plurality of receiver stations axially spaced at different distances from the acoustic source. An isolator section isolates the source and receiver sections from direct acoustic transmission. The logging tool also comprises an instrument section comprising power, processor, memory and control elements, a downhole telemetry section, and a directional section that yields the absolute orientation of the logging tool. In addition to the logging tool, the logging system comprises a conveyance means, draw works, surface equipment comprising a surface telemetry element, and a surface recorder. All system elements will be described in detail in subsequent sections of this disclosure. The source and receiver sections of the logging tool rotate azimuthally as the logging tool is conveyed along the well borehole.

Acoustic logging system responses are presented for three basic system configurations in a variety of anisotrophic formations. The first response modeling is for a wireline tool comprising a monopole acoustic source operating at a frequency of 10 KHz, and further comprising six receiver stations at six different axial spacings from the source, wherein each station comprising one monopole acoustic receiver. The second response modeling is for a wireline tool comprising a dipole acoustic source operating at 2 KHz, and further comprising eight receiver stations at eight different axial spacings from the source and with each station comprising two directional acoustic receivers at 180 degrees from each other. The third response modeling is for a LWD tool that comprises a single sided unipole acoustic source operating at 6 and 12 KHz, and further comprising six receiver stations at six different axial spacings from the source with each station comprising one directional acoustic receiver lined up with the source. It is noted that additional modeling was made for a LWD tool comprising a dipole source with a receiver array that is configured the same as the third response model defined above. Response results from the dipole LWD tool, operating at the same frequency as the third (unipole) response model, were essentially the same as the third response model comprising the unipole source. Details of the LWD "high frequency" dipole model results have, therefore, been omitted from this disclosure for brevity but are included in the analysis of the system response results.

In each of the above configurations, model response results were obtained for the acoustic source and receiver sections rotating synchronously about the major axis of the borehole in an HTI anisotropic formation. It was assumed that the formation anisotropy is azimuthally symmetric around the wall of the borehole. Waveform data were generated in contiguous azimuthal angle segments $\Delta\theta_i$=15 degrees in the range of 0 to 90 degrees (i.e. i=1, 2, . . . , 6). Time-slowness coherence analysis (STC) was used to determine the shear velocity in each azimuthal angle segments $\Delta\theta_i$. Other methods such as maximum likelihood or slowness frequency coherence analysis can be used to determine the formation velocities.

The operation procedures for the acoustic logging system, whether LWD or wireline, are summarized as follows. The logging tool, with synchronously rotating source and receiver sections, is conveyed along the borehole. The acoustic source within the source section is fired periodically as the source section rotates. The acoustic wave field generated by the acoustic pulse is received by the plurality of detectors in the receiver section. These waveforms are conditioned and digitized using an analog to digital converter typically disposed within the instrument section of the logging tool. Measured waveform data are partitioned into azimuthal angle segments $\Delta\theta_i$ for each 360 degree revolution of the source and receiver sections. Shear velocity is computed for each azimuthal angle segments $\Delta\theta_i$. A cross-over angle segments $\Delta\theta_C$, if present, is determined from the $\Delta\theta_i$ along with a corresponding cross-over angle $\theta_C$. The above steps are repeated for each source section-receiver section revolution within the borehole. For each revolution, the cross-over angle $\theta_C$ is related to an absolute reference angle $\theta_{ABS}$ using output from a directional section of the logging tool. The absolute reference angle can be magnetic north, the high side of a deviated borehole, and the like. Anisotropic formation parameters and other parameters of interest (POI) are obtained from measured and computed data. Depth of the tool in the borehole and the above steps are repeated. Parameters of interest are recorded as a function of depth of the logging tool within the borehole thereby generating a "log" of the parameters of interest.

BRIEF DESCRIPTION OF THE DRAWINGS

The manner in which the above recited features and advantages, briefly summarized above, are obtained can be understood in detail by reference to the embodiments illustrated in the appended drawings.

DETAILED DESCRIPTION OF THE PREFERRED EMBODIMENTS

Figure 1:
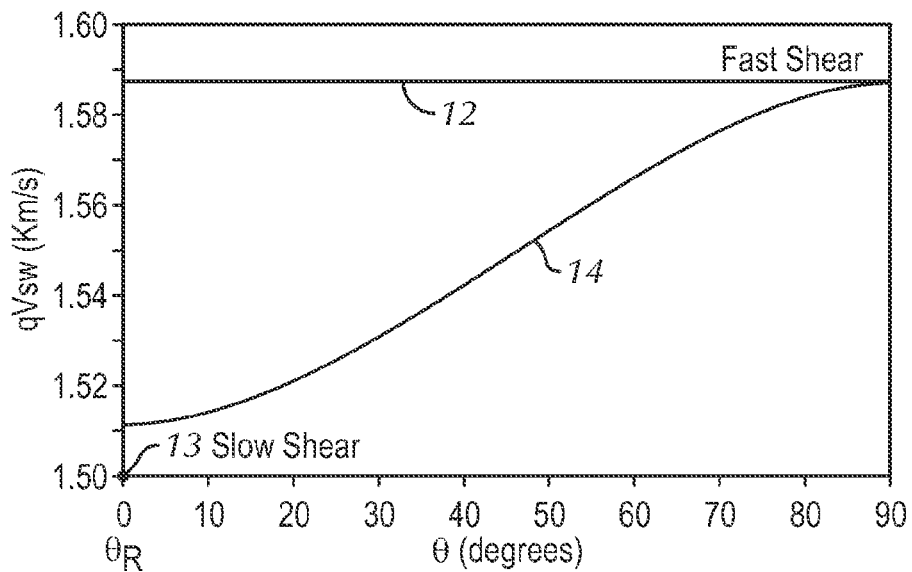
FIG. 1 is a modeled plot of shear wave velocity as a function of azimuthal angle in an anisotropic formation.

This invention is a system for measuring acoustic properties of anisotropic earth formation penetrated by a well borehole. The system can be embodied as a LWD system in which the source and receiver sections are typically disposed within a drill collar that normally rotates both sections synchronously within the borehole. It is again mentioned that the disclosed LWD apparatus and methods are equally applicable to MWD systems. The concepts of the invention can also be embodied as a wireline logging system if the source and receiver sections are synchronously rotated as the wireline tool is conveyed within a borehole. The logging systems are designed to operate in, and further to measure anisotrophic properties of the material using a unipole or a dipole acoustic source. Anisotropic measurements are used in a variety of geophysical applications including the correction of other acoustic property measurements used in formation evaluation and seismic applications.

The responses of the unipole and dipole LWD and wireline systems are illustrated by formation and tool response modeling.

Modeling of Anisotropic Formations

As mentioned previously, most earth formations or "rocks" have anisotropic structure resulting from layering, micro fractures, or orientation of mineral deposits in a certain direction. This internal stress causes the shear velocity to vary with propagation direction. Transverse isotropy (TI) is commonly used to model formation anisotropy. The TI anisotropy has a symmetry axis such that material properties and velocities do not vary along any direction transverse to this axis. Examples of TI anisotropy are horizontal transverse isotropy (HTI) where the axis of symmetry is horizontal. An example of an HTI formation is anisotropy (caused by fractures, for example) in a plane coincident with the borehole axis in a vertical well. Another example of TI anisotropy is vertical transverse isotropy (VTI), where the axis of symmetry is vertical. An example of a VTI formation is anisotropy along the borehole axis in a vertical well, which is commonly caused by bedding planes.

The following formalism is used to compute idealized or "theoretical" acoustic tool responses in anisotropic formations. Formation anisotropy is defined by a matrix of elastic constants, C, relating the stress to the strain vectors. The matrix of the elastic constants has nine independent coefficients as shown in the following equation:

$$C = \begin{pmatrix} C_{11} & C_{12} & C_{13} & 0 & 0 & 0 \\ C_{12} & C_{22} & C_{23} & 0 & 0 & 0 \\ C_{13} & C_{23} & C_{33} & 0 & 0 & 0 \\ 0 & 0 & 0 & C_{44} & 0 & 0 \\ 0 & 0 & 0 & 0 & C_{55} & 0 \\ 0 & 0 & 0 & 0 & 0 & C_{66} \end{pmatrix} \quad (1)$$

In an isotropic formation;

$$C_{11}=C_{22}=C_{33}=\lambda+2\mu \quad (2)$$

$$C_{12}=C_{13}=C_{23}=\lambda \quad (3)$$

$$C_{44}=C_{55}=C_{66}=\mu \quad (4)$$

where $\lambda$, and $\mu$ are the Lamé bulk and shear constants of the medium. In an isotropic medium, the compressional and shear velocities do not vary with propagation direction and propagate in a direction normal to the tangent of the wave front.

In an anisotropic formation, the velocity varies with propagation direction. In a transversely isotropic formation, which is a common representation of an anisotropic medium, the quasi compressional velocity, $qV_P$, is given by $$qV_P^2(\theta) = \frac{1}{2\rho}(C_{33} + C_{44} + (C_{11} - C_{33})\mathrm{Sin}^2(\theta) + D). \quad (5)$$

The quasi shear velocity, $qV_{SV}$, is given by $$qV_{SV}^2(\theta) = \frac{1}{2\rho}(C_{33} + C_{44} + (C_{11} - C_{33})\mathrm{Sin}^2(\theta) - D), \quad (6)$$

and the shear velocity, $qV_{SH}$ is given by $$qV_{SH}^2(\theta) = \frac{1}{\rho}(C_{66}\mathrm{Sin}^2(\theta) + C_{44}\mathrm{Cos}^2(\theta)), \quad (7)$$

where $$D = \sqrt{\begin{array}{c}(C_{33} - C_{44})^2 + 2(2(C_{13} + C_{44})^2 - (C_{33} - C_{44})(C_{11} + C_{33} - 2C_{44}))\mathrm{Sin}^2(\theta) + \\ ((C_{11} + C_{33} - 2C_{44})^2 - 4(C_{13} + C_{44})^2)\mathrm{Sin}^4(\theta)\end{array}} \quad (8)$$

$\rho$=the density of the formation, and
$\theta$=the phase angle between the wave front normal and the axis of symmetry.

FIG. 1 is a plot of $\theta$ (abscissa) versus $qV_{SH}$ (ordinate) and shows an example of the expected shear velocity ($qV_{SH}$) profile in an anisotropic formation. The curve 12 indicates the velocity of the isotropic rock and curve 14 is the velocity in an anisotropic formation using a model of a water-filled crack with a spatial density of 0.05 and aspect ratio of 0.05.

Table 1 shows the parameters used to simulate anisotropic formations with different velocities using equations (1) through (8). It is noted that for the chalk formation, the shear velocity is slower than the mud velocity where no refracted shear is detected. The Bakken shale is fast and refracted shear should be detected at any mud velocity. The shear velocity of Phenolite is comparable to the velocity of water and refracted shear is detected only if the mud velocity is higher than roughly 210 us/ft. Table II shows the theoretical shear velocities in these formations.

TABLE 1

Formation Properties used for Modeling HTI anisotropy

| Model | Density (g/cc) | $C_{11}$ (GPa) | $C_{12} = C_{13}$ (GPa) | $C_{22} = C_{33}$ (GPa) | $C_{23}$ (GPa) | $C_{44}$ (GPa) | $C_{55} = C_{66}$ (GPa) |
|---|---|---|---|---|---|---|---|
| Phenolite | 1.32 | 10.58 | 5.71 | 13.61 | 6.68 | 3.42 | 2.97 |
| Bakken Shale | 2.23 | 26.9 | 8.5 | 42.9 | 12.35 | 15.3 | 10.5 |
| Chalk | 2.19 | 14 | 12 | 22 | 15.8 | 3.1 | 2.4 |

TABLE 2

Formation Slow and Fast Shear Velocities for the Modeled HTI anisotropy

| Model | Slow Shear (us/ft) | Fast Shear (us/ft) |
|---|---|---|
| Phenolite | 202.27 | 189.36 |
| Bakken Shale | 138.01 | 116.36 |
| Chalk | 289.09 | 256.46 |

Modeling of Acoustic Tool Response in Anisotropic Formations

Responses of various acoustic logging systems were modeled in anisotropic formations, in a well borehole environment, using a finite difference model. These model results are used to determine optimum parameters for determining anisotropic properties of interest, and to illustrate the advantages of rotating LWD and wireline systems using a unipole or a dipole acoustic source operating at relatively high frequencies.

Figure 2B:
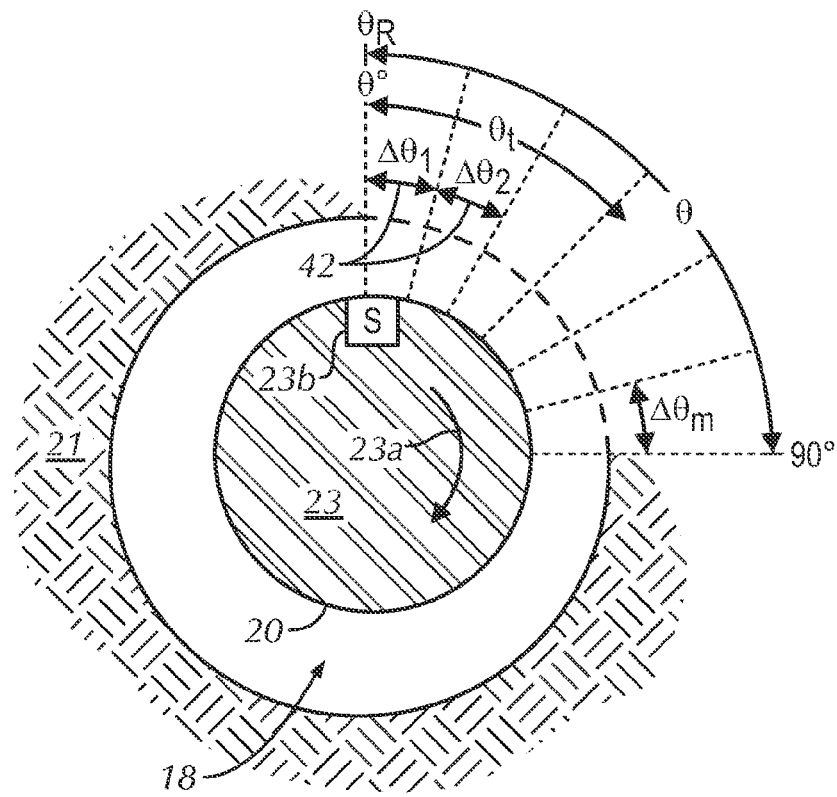
FIG. 2B is a conceptual sectional view of an acoustic logging tool disposed within a borehole and taken through the source section.
Figure 2A:
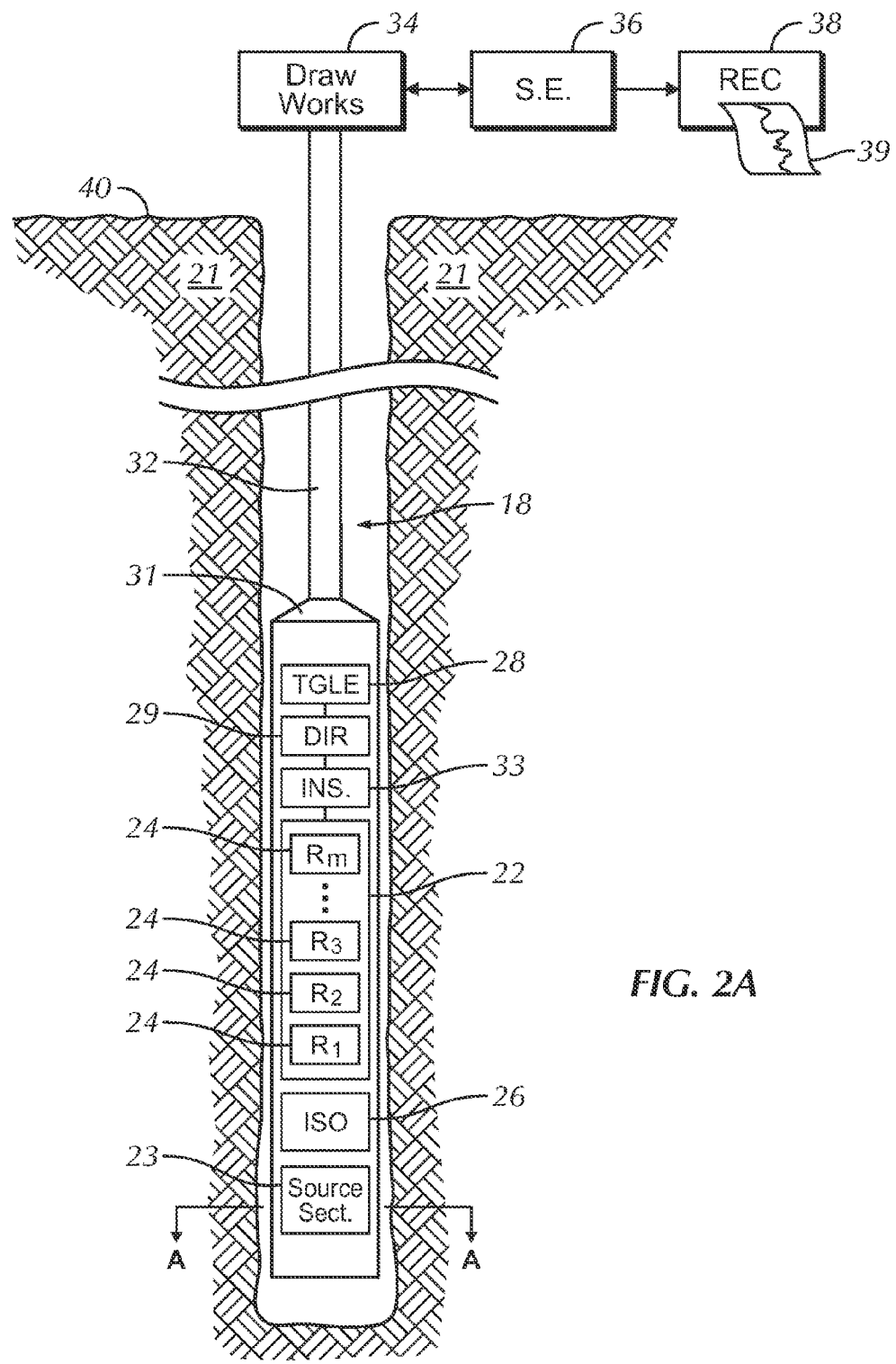
FIG. 2A is a conceptual side view illustration of an acoustic logging system in a borehole environment.

A conceptual side view illustration of an acoustic logging system in a borehole environment is show in FIG. 2A. An acoustic borehole instrument or "tool" 20 comprising a source section 23, operating at a frequency of approximately 4 KHz or greater, and a receiver section 22 is shown suspended in a borehole 18 that penetrates earth formation material 21. The receiver section 22 comprises a plurality of axially spaced receiver stations $R_1, R_2, \ldots R_m$ shown at 24. An isolation section 26 is used to minimize direct transmission of acoustic energy from the source section 23 to the receiver section 22. The tool 20 is attached to a lower end of conveyance means 32 by a suitable connector 31. The upper end of the conveyance means 32 terminates at draw works 34, which is electrically connected to surface equipment 36. Output from the surface equipment 36 cooperates with a recorder 38 that produces a measure, or "log", of one or more parameters of interest as a function of depth within the well borehole. If the acoustic logging system is a wireline system, the acoustic tool 20 is a wireline tool, the conveyance means 32 is a logging cable, and the draw works 34 is a cable winch hoist system that is well known in the art. The cable also serves as a data and control conduit between the wireline logging tool 20 and the surface equipment 36. If the acoustic logging system is a LWD system, the acoustic tool 20 is a acoustic tool typically disposed within a drill collar, the conveyance means 32 is a drill string, and the draw works 34 is a rotary drilling rig that is well known in the art.

Still referring to FIG. 2A, the tool 20 further comprises an instrument section 33 that comprises power, control, processor and memory elements required to operate the tool. The tool 20 also comprises a directional section 29 that is used to measure an "absolute" position of the logging tool 20, as will be discussed in subsequent sections of this disclosure. A downhole telemetry element is shown at 28. This is used to telemeter data between the tool 20 and an "uphole" telemetry element (not shown) preferably disposed in the surface equipment 36. These data can include measured acoustic data and computed acoustic parameters. These data can optionally be stored within memory (not shown), preferably disposed within the instrument section 33, for subsequent removal and processing at the surface of the earth 40. Command data for operating the tool 20 can also be telemetered from the surface via the telemetry system.

FIG. 2B is a sectional view of the tool 20 taken through the source section 23 of the tool 20 disposed within the borehole 18. The source section 23 (and therefore the tool 20) rotates about the major axis of the tool 20 as indicated conceptually by the arrow 23a. An acoustic source, which assumed to be a unipole source for purposes of this illustration, is shown at 23b. The angle θ is defined by the acoustic wave front normal emitted by the source 23b and the major axis of symmetry of the tool 20. A reference angle $\theta_R$ is defined as 0 degrees for convenience, and azimuthal angle segments $\Delta\theta_1, \Delta\theta_2, \ldots \Delta\theta_n$ are shown at 42. These azimuthal angle segments, as well as the "cross-over" angle $\Delta\theta_C$, will be discussed in subsequent sections of this disclosure.

Response Model Results

This invention is an LWD or a wireline logging system for measuring acoustic properties in anisotrophic properties a unipole or a dipole acoustic source.

Again referring to FIGS. 2A and 2B, responses of acoustic logging systems in anisotropic formations were modeled for the following configurations:

Configuration 1: A wireline tool 20 with:
(a) a monopole acoustic source operating at 10 KHz and disposed in the source section 23; and
(b) six receiver stations 24 with each station comprising one acoustic receiver.

Configuration 2: A wireline tool 20 with
(a) a dipole acoustic source operating at 2 KHz and disposed in the source section 23; and
(b) eight receiver stations 24 with each station comprising two acoustic receivers.

Configuration 3: An LWD tool 20 that is 6.75 inches (17.2 centimeters) in diameter and with
(a) a single sided unipole acoustic source operating at 6 and 12 KHz and disposed in the source section 23; and
(b) six receiver stations 24 with each station comprising one acoustic receiver.

For each of the above configurations, tool 20 was centered (as shown in FIG. 2B) within a borehole 18 with a 8.5 inch (22.2 centimeters) diameter, and the borehole was filled with 202 us/ft (61.57 us/meter) mud which is fresh water.

In each of the above configurations, model response results were obtained for the logging tool 20 tool rotating about the major axis of the borehole 18 and in an HTI anisotropic formation. It was assumed that the anisotropy is azimuthally symmetric. Waveform data were generated in contiguous azimuthal angle segments $\Delta\theta_i$=15 degrees in the range of 0 to 90 degrees (i.e. i=1, 2, . . . , 6) using previously defined nomenclature. Again $\Delta\theta_R$=0 degrees is defined as the tool azimuthal reference angle. Time-slowness coherence analysis (STC) was used to determine the shear velocity. Shear velocities were computed from the semblance projection at each angle and compared to their theoretical values.

Response Model Results-Monopole Sources

Monopole acoustic sources are not azimuthally directional. Tools with monopole sources can identify formation shear anisotrophy only if the anisotrophy ratio is large enough for the slow and fast shear velocities to register two peaks on a semblance plot projection. For weak anisotropy of 7 percent or less, the shear peaks may not be resolved and the measured shear velocity will be somewhere between the actual fast and slow shear velocities. Moreover, the direction of maximum stress can not be identified using a monopole source.

The responses of a monopole source tool, operating at 10 KHz, in two modeled formations are presented to illustrate the above mentioned limitations of the monopole source. More specifically, the wireline monopole tool Configuration 1 is used as an example of the data obtained from a monopole source in an anisotropic formation. The source and receiver sections of the wireline tool are rotated synchronously within the borehole. Results and conclusions obtained from the rotating wireline tool can also be applied to an LWD tool with a monopole source.

The results of a monopole source were similar for all modeled tool responses. Since the monopole data do not change significantly while the tool is rotating in the borehole, the model at any rotational angle produced essentially the same results.

Figure 3:
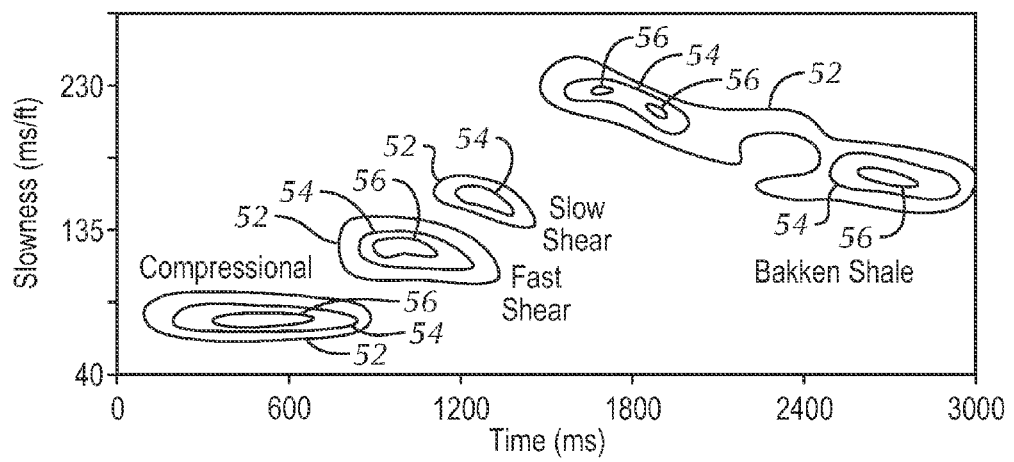
FIG. 3 shows, for a given azimuthal angle segment, a conceptual slowness time coherence (STC) map from a wireline tool comprising a monopole (10 KHz) source in a Bakken shale formation.

FIG. 3 shows, for a given azimuthal segment $\Delta\theta_i$, a conceptual STC map of the wireline tool monopole data in the Bakken shale formation. The STC map has been conceptualized for brevity and comprises a plot of slowness (ordinate) as a function of arrival times from the wave field responses recorded by the receivers 24 shown in FIG. 2A. Slowness and arrival times are expressed in units of microseconds per foot (us/ft) and microseconds (ms), respectively, for this and the STC map follows. Contours 52, 54 and 56 indicate values of increasing magnitude, respectfully. The two arrivals seen in the map are the fast and slow shear velocities which are clearly identified. The map also shows the compressional arrival.

Figure 4:
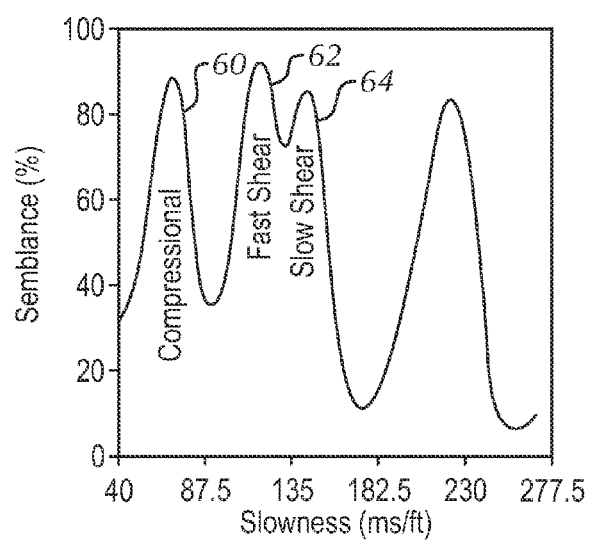
FIG. 4 is the semblance projection of the STC map for the angular segment of FIG. 3.

The semblance projection of the STC map for the angular segment of FIG. 3 is shown in FIG. 4 where semblance in percent (ordinate) is plotted as a function of slowness (us/ft). The projection shows two distinguished fast shear and slow shear peaks 62 and 64, respectively, falling at 118 and 145 us/ft, which are fairly close to the slow and fast shear velocities of the formation tabulated in Table 2. However, the reason for the two distinguished peaks 62 and 64 in this example is the relatively high anisotropy ratio (20%). If the anisotropy ratio is reduced, the two peaks may not be resolved as illustrated in the following example.

Figure 5:
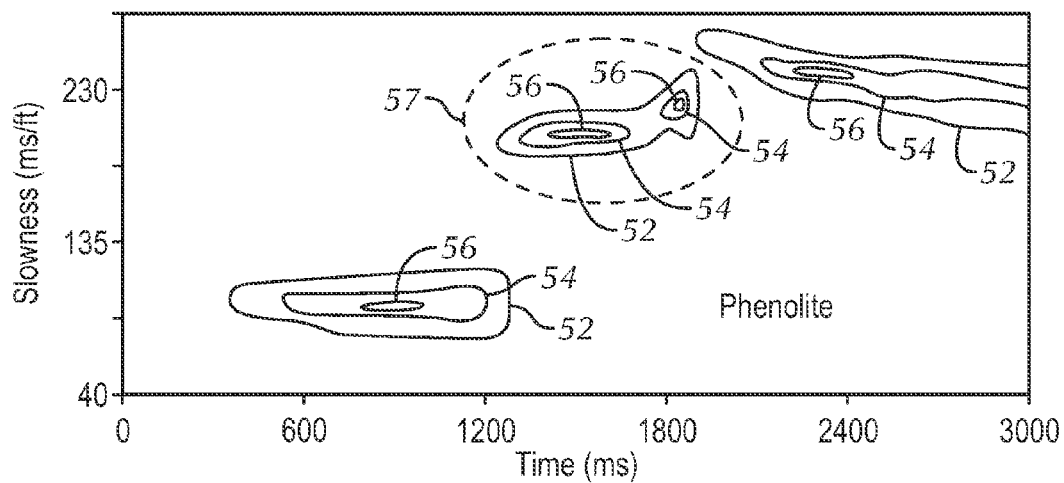
FIG. 5 shows, for a given azimuthal angular segment, a conceptual STC map of from the wireline tool comprising a monopole (10 KHz) source for a Phenolite formation.
Figure 6:
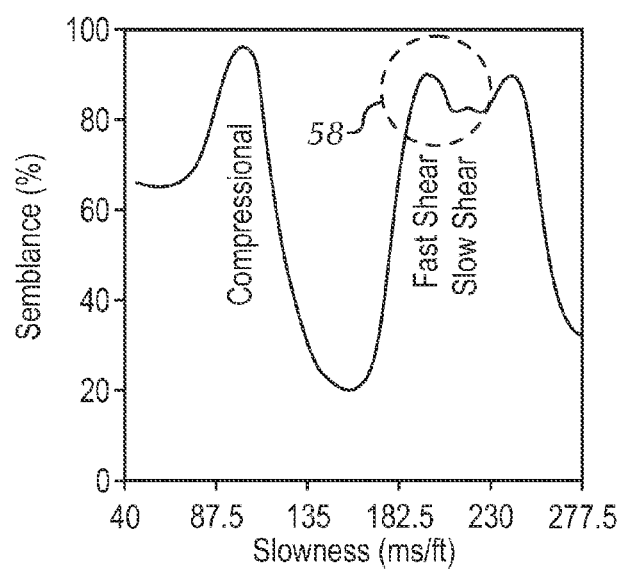
FIG. 6 is the semblance projection of the STC map of FIG. 5.

FIG. 5 shows the STC map, for a given angular segment $\Delta\theta_i$, of the wireline tool monopole data for the Phenolite formation, which has an anisotropy ratio of 7%. The fast and slow shear velocities, inclosed in the dashed oval 57, are not clearly identified. The semblance projection of the STC map of FIG. 5 is shown in FIG. 6. In this formation, the fast and shear arrivals are both within the dashed oval 58 and therefore cannot be resolved on the projection plot. The peak value of the arrival depends on the maximum coherence, which happened to be at the fast arrival of 190 us/ft in this case. Other cases may be different and the peak value could be any where between the two velocities depending coherence.

Using the two models of a wireline tool comprising a monopole source, the following conclusions are apparent.

The monopole source can be used to identify formation fast and slow shear wave slowness, and therefore shear anisotropy, as a function of angular segment $\Delta\theta_i$, only if the anisotropy ratio is high enough for the slow and fast shear velocities to register two peaks on the semblance plot. However, for typical weak anisotropy of 7% of less, the slow and fast shear velocity peaks can not be resolved, and the measured shear velocity will be somewhere between the two velocities. Moreover, the direction of maximum stress cannot be identified from monopole sources. It is again emphasized that the wireline monopole tool Configuration 1 was used to obtain the above responses of a monopole source in an anisotropic formation. Similar results are obtained by modeling a LWD tool with a monopole source, or an LWD tool with a unipole source after averaging the data from several shots acquired while rotating the tool within the borehole through angle θ.

Response Model Results-Dipole and Unipole Sources

Dipole and unipole sources are azimuthally directional and are therefore conceptually suited for measuring azimuthal anisotrophy.

Wireline tools comprising crossed dipole acoustic sources have been used in the prior art to measure formation anisotropy. Details of a cross dipole anisotropy wireline system are disclosed in U.S. Pat. Nos. 5,343,441; 7,310,285 B2; 7,646,674 B2; and 6,098,021, which are incorporated herein by reference. A wireline tool typically does not rotate as it is conveyed along the borehole. Mechanical means can, in principle, be embodied to synchronously rotate (at least) the source and receiver and receiver sections in order to obtain the desired anisotropy sensitivity of this invention.

While the conclusions made for monopole sources can be applied equally to wireline and LWD tools, acoustic signals from dipole sources are vastly different when used while drilling. One of the main differences is not being able to operate a dipole source at low frequency while drilling because of interference from the drilling noise. Operating a dipole source at high frequencies (4-8 KHz) requires much larger dispersion corrections than when operating at low frequencies (1-2 KHz). Second, the mass and stiffness of the drill collar affects the dipole measurements while drilling, which makes the measurement made from an LWD tool at 4-8 KHz only marginally better than the one obtained from a single-sided monopole (unipole) source.

Wireline Dipole Source

Anisotropy measurements from a low frequency dipole source in a wireline tool are typically made using what is known as crossed-dipole measurements. Referring again to FIGS. 2A and 2B, crossed-dipole measurements are made using two sets of orthogonal dipole transmitters disposed within the source section 23, and with each receiver station 24 comprising orthogonal receivers. This is the previously described wireline Configuration 2. The orthogonal transmitters and receivers are azimuthally aligned. Waveform data are collected in the inline and cross-line receivers from the orthogonal transmitters to form four waveform data sets usually referred to as XX, YY (inline) and XY and YX (cross-line). A mathematical rotation, commonly known as Alford Rotation, shown in U.S. Pat. No. 5,343,441, which is incorporated herein by reference. is then applied to the four sets of data to obtain the slow and fast velocities and the direction of maximum stress.

Figure 7:
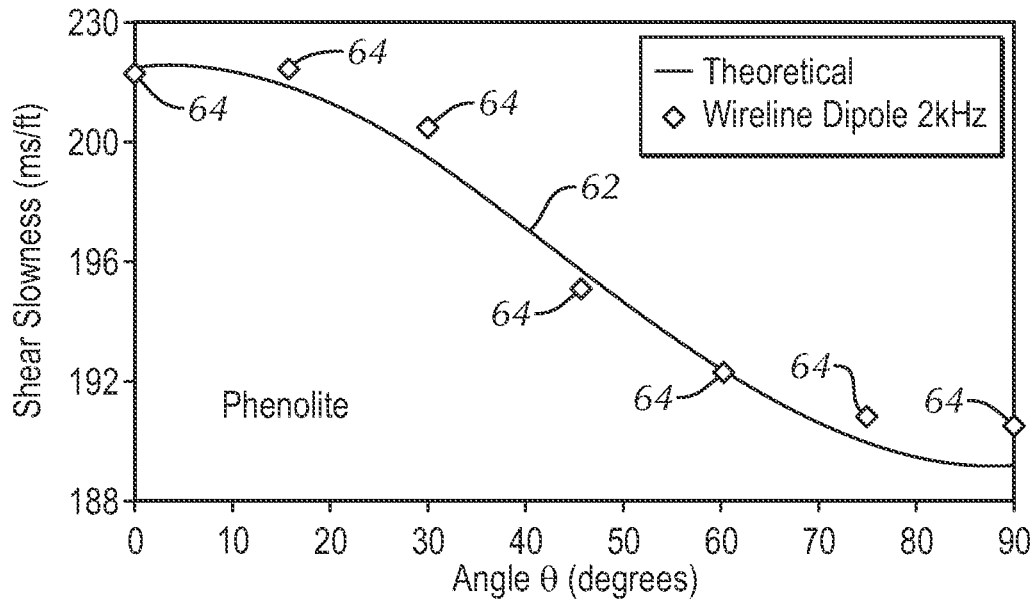
FIG. 7 illustrates the response of a rotating wireline tool with a low-frequency dipole (2 KHz) source in anisotropic Phenolite formation.

In theory, the shear measurements from a mechanically rotating dipole wireline tool should track the theoretical values shown in FIG. 1. The response, in anisotropic Phenolite, of a rotating wireline tool with a low-frequency dipole (2 KHz) is shown in FIG. 7. The illustration is a plot of shear slowness (us/ft) as a function of azimuthal angle of tool rotation θ(degrees). The "theoretical" curve 62 represents the response calculated using equations (1)-(8) and "measured" tool shear velocities modeled in 15 degree azimuthal segments $\Delta\theta_i$ are identified as 64. FIG. 7 shows a fairly good agreement measured values 64 and the theoretical values represented by the curve 62. Illustrations of corresponding STC maps and corresponding semblance projections have been omitted for brevity.

Figure 8:
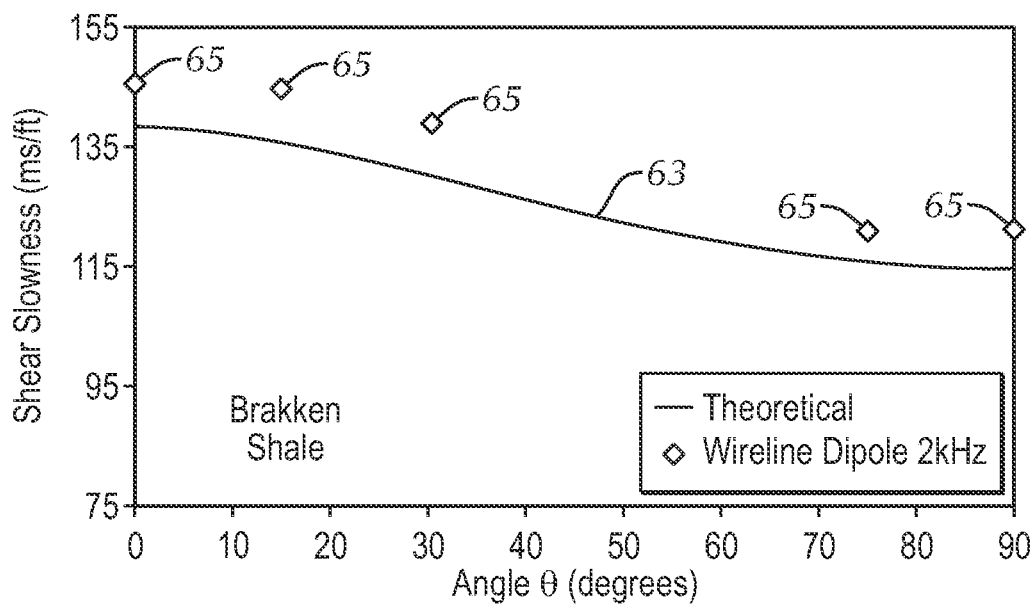
FIG. 8 illustrates the response of the rotating wireline tool with a 2 KHz dipole source in anisotropic Bakken shale formation.

The response of the rotating wireline tool formation with a 2 KHz dipole source in anisotropic Bakken shale is shown in FIG. 8. As in FIG. 7, FIG. 8 is a plot of shear slowness as a function of θ. The curve 63 represents the theoretical response calculated using equations (1)-(8) and measured tool shear velocities modeled in 15 degree azimuthal segments $\Delta\theta_i$ are identified as 65. STC maps (not shown) at azimuthal segments $\Delta\theta_i$=45 degrees and 60 degrees indicate that the shear velocity arrivals can not be resolved, therefore measured values 65 in these azimuthal segments have been omitted. The overall higher measured slowness compared to the theoretical slowness 63 is to due to dispersion effects. This is more noticeable for the Bakken shale case given the fast shear velocity arriving at a relatively high frequency (3-4 KHz).

Figure 9:
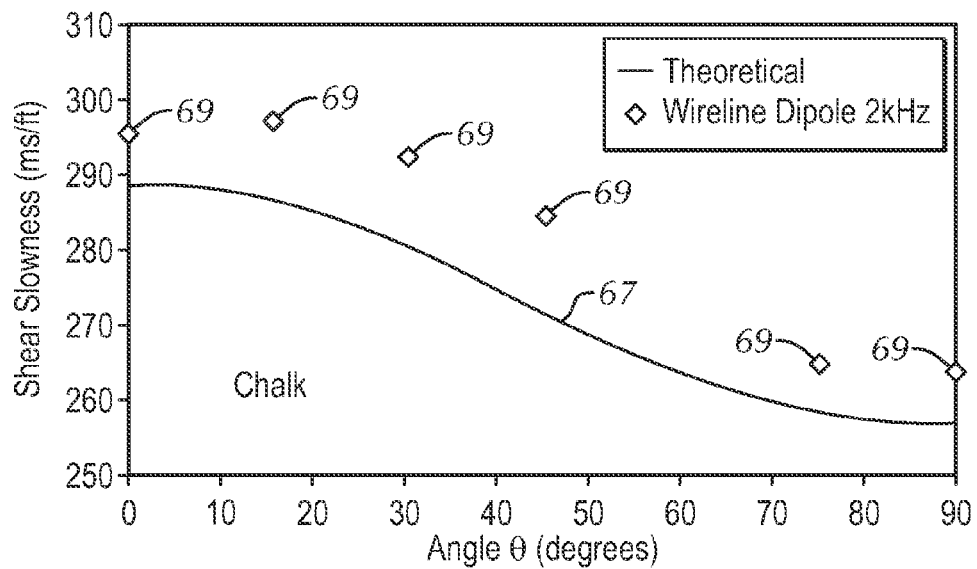
FIG. 9 illustrates the response of the rotating wireline tool with a 2 KHz dipole source in an anisotropic chalk formation.

The response of the rotating wireline tool formation with a 2 KHz dipole source in anisotropic chalk formation is shown in FIG. 9. Once again, FIG. 9 is a plot of shear slowness as a function of θ. The curve 67 represents the theoretical response calculated using equations (1)-(8) and "measured" tool shear velocities modeled in 15 degree azimuthal segments $\Delta\theta_i$ are identified as 69 shows. An STC map (not shown) at azimuthal segments $\Delta\theta_i$=60 degrees indicates that fast and shear velocity arrivals can not be resolved, therefore measured values 69 in this azimuthal segment has been omitted. As in the case of the Bakken shale, the overall higher measured slowness 69 compared to the theoretical slowness 67 is to due to dispersion effects.

Given that the above rotating wireline dipole data tracks the theoretical velocity profile while rotating, several anisotropy parameters can be determined from the data:

1. The slow and fast shear velocities can be determined as the minimum and maximum velocities measured while rotating;
2. The anisotropy ratio can be readily calculated from the minimum and maximum shear velocities; and
3. The directions of maximum/minimum stresses can also be readily calculated from the angles at which the minim and maximum velocities are measured.

To summarize, low frequency crossed-dipole measurements from wireline tools are well established, but due to the previously noted reasons, they cannot be applied to a LWD acoustic system. Therefore, there is a need for a method of detecting anisotropy while drilling. Given that LWD tools rotate most of the time, a new principle based on a rotating unipole tool is introduced in the following section.

The LWD Unipole and Dipole Acoustic Logging System

Unipole acoustic sources emit energy pulses that are azimuthally directional. The following results are obtained using a unipole source disposed within a LWD tool such that the emitted pulse is essentially orthogonal to the major axis of the tool. A conceptual illustration of the unipole source disposition is illustrated at 23b in FIG. 2B. Furthermore, acoustic receivers disposed within axially spaced receiver stations 24 shown in FIG. 2A are preferably azimuthally aligned with the unipole source. This is the previously defined LWD Configuration 3.

An LWD logging tool comprising a dipole source operating in the 6 and 12 KHz range can be used in a drilling environment. Modeling results show no significant difference in tool response employing a high frequency dipole source and a unipole source operating at the same frequency. Although results in the following section are given for a unipole acoustic source, the same results are applicable to a LWD tool operating at the same frequency and are so indicated in the following illustrations.

Figure 10:
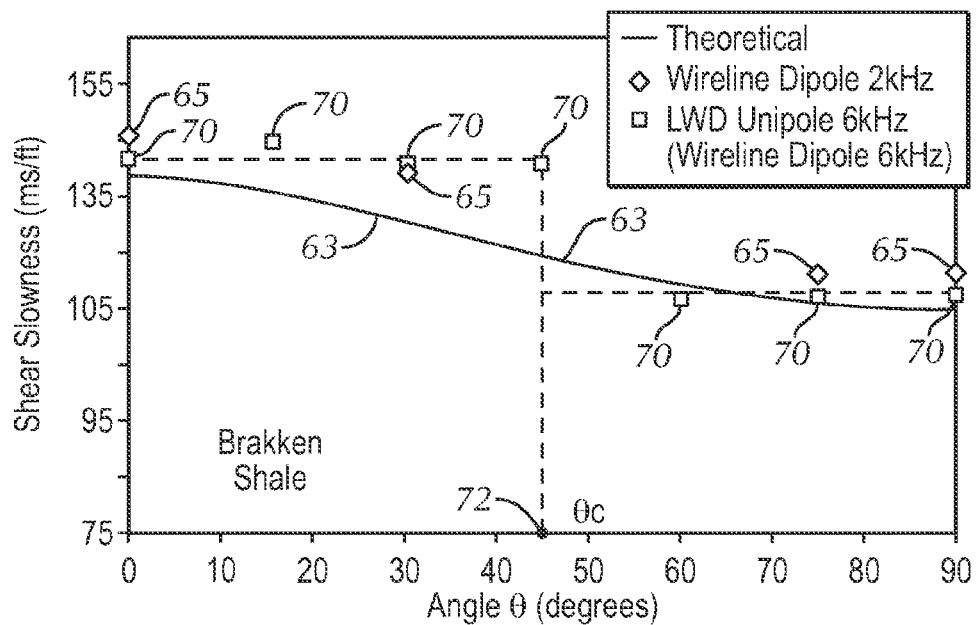
FIG. 10 illustrates the response of a rotating LWD tool with a 6 KHz unipole source in an anisotropic Bakken shale formation.

In fast formations where refracted shear waves are detected from a unipole source, the velocity profile obtained from a rotating unipole tool agrees with the theoretical values at the fast and slow directions, and changes fairly abruptly from one velocity to the other velocity at $\theta=45$ degrees. This trend can be seen in FIG. 10. More specifically, FIG. 10 illustrates the response of a rotating LWD tool with a 6 KHz unipole source in anisotropic Bakken shale formation. Once again, FIG. 10 is a plot of shear slowness as a function of angle $\theta$. As stated previously, modeling of a rotating wireline tool with a dipole source operating at 6 KHz yielded essentially the same results as a rotating LWD tool with a dipole source operating at 6 KHz. The higher 6 KHz frequency is operational feasible in a drilling environment as previously discussed. The curve 63 represents the response calculated using equations (1)-(8) and is essentially identical to the results for the 2 KHz dipole wireline tool shown in FIG. 8. The measured shear velocities modeled in 15 degree azimuthal segments $\Delta\theta_i$ are identified as 65 are for the 2 KHz dipole wireline tool and are shown for reference. The measured shear velocities modeled in 15 degree azimuthal segments $\Delta\theta_i$ are identified as 70 are for the 6 KHz unipole LWD tool. As mentioned previously, essentially identical results were obtained for a rotating wireline tool with a 6 KHz source, therefore the measurements 70 are shown to represent both embodiments. The measured values 70 are relatively constant on either side of $\Delta\theta_i=45$ degrees as indicated by the broken horizontal lines. There is an abrupt change in shear slowness at $\theta=45$ degrees. This angle 72 is defined as the "cross-over" angle and is hereafter denoted as $\theta_C$. The abrupt change at $\theta_C=45$ degrees does, therefore, define the azimuthal position of the change in shear wave velocity and thus a relative azimuthal direction for shear anisotrophy.

Figure 11:
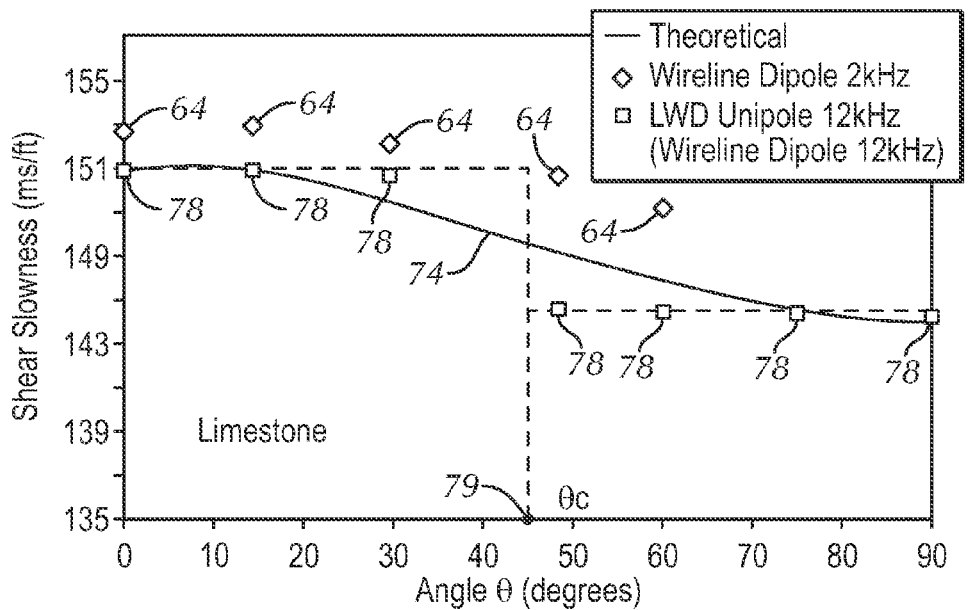
FIG. 11 illustrates the response of a rotating LWD tool with a 12 KHz unipole source in an anisotropic limestone formation.

The abrupt change in shear arrival shown in the Bakken shale was confirmed by similar modeling in a limestone formation with 5 percent HTI anisotrophy. These results are shown in FIG. 11. Again, FIG. 11 is a plot of shear slowness as a function of $\theta$. Data points 64 have been previously discussed and function in this discussion as reference measurements from the rotating wireline tool with a dipole source operating at 2 KHz. The curve 74 represents the theoretical response calculated using equations (1)-(8). The measured shear velocities modeled in 15 degree azimuthal segments $\Delta\theta_i$ are identified as 78 are for a 12 KHz unipole LWD tool as well as a 12 KHz dipole wireline tool. As in the previous illustration, the measured values 78 are relatively constant on either side of $\theta=45$ degrees as indicated by the broken lines. An abrupt change occurs again at $\theta_C=45$ degrees thereby defining the azimuthal position of the change in shear wave velocity and thus a relative azimuthal direction for shear anisotrophy.

Figure 12:
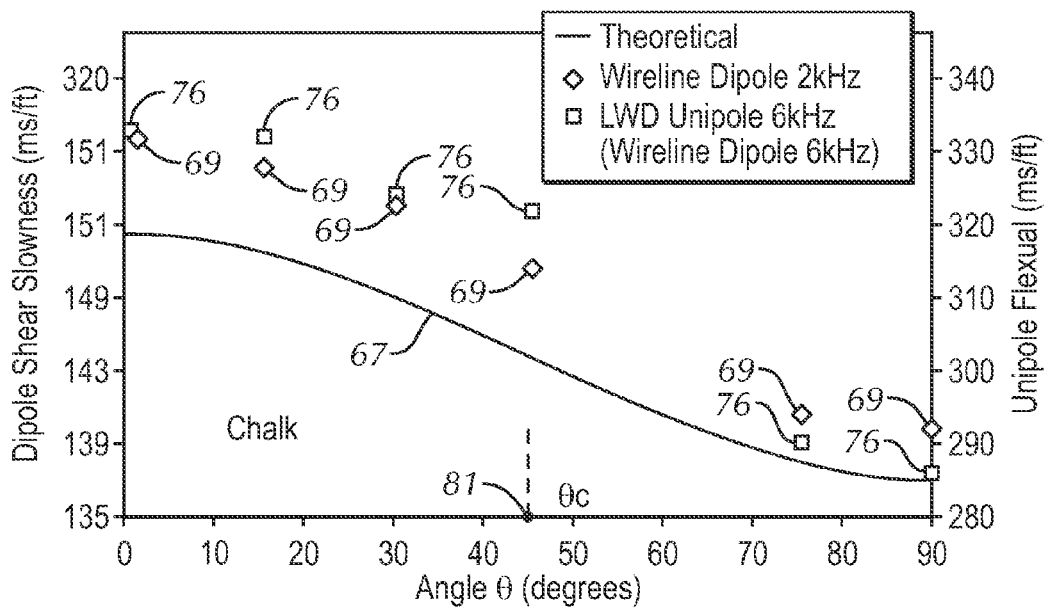
FIG. 12 illustrates the response of a rotating LWD tool with a 6 KHz unipole source in anisotropic chalk formation.

FIG. 12 is a plot of shear slowness as a function of $\Delta\theta_i$ in an anisotropic chalk formation. Recall that the chalk formation is relatively slow (see Table 2). Data points 69 are the reference measurements from the rotating wireline tool with a dipole source operating at 2 KHz and are the same as those shown in FIG. 9. The curve 67 represents the response calculated using equations (1)-(8) and is likewise the same as the theoretical curve shown in FIG. 9. The measured shear velocities modeled in 15 degree azimuthal segments $\Delta\theta_i$ are identified as 80 are for the 6 KHz unipole LWD tool and also representative of the response for a 6 KHz dipole wireline tool. Although there is an abrupt change in the LWD measured values 80 on either side of $\Delta\theta_i=45$ degrees, the values are not relatively constant on either side. As a result, in slow formations such as chalk, refracted shear (as scaled on the right ordinate axis) cannot be detected by a unipole source. However, flexural waves (as scaled on the left ordinate axis) from a unipole source were found to behave similar to a low-frequency dipole source in anisotropic formation but with much larger dispersion corrections.

Figure 13:
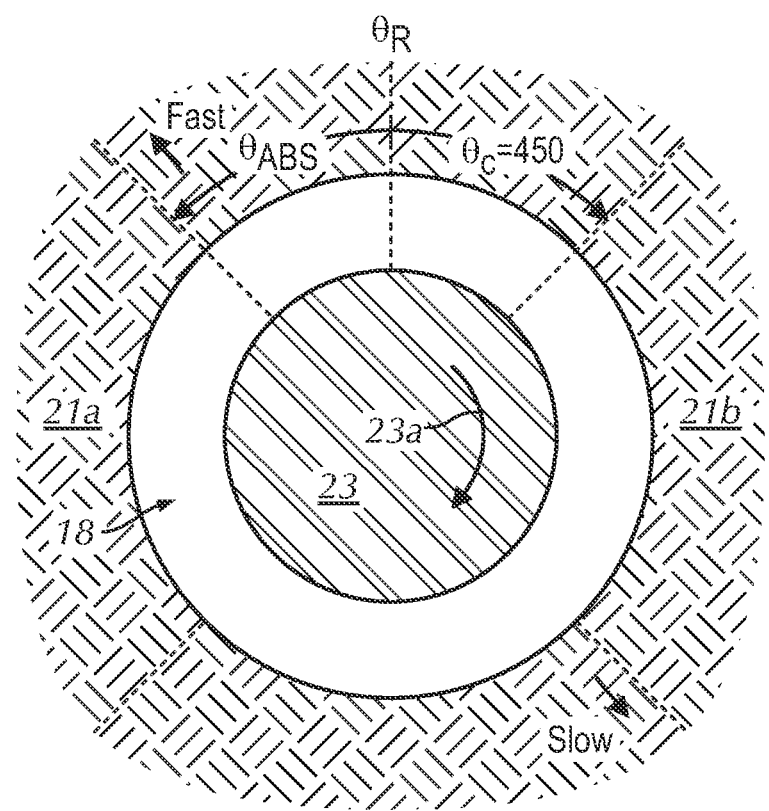
FIG. 13 is a conceptual cross sectional view of a rotating logging tool comprising a unipole or a dipole acoustic source operating at the same relatively high frequency.

FIG. 13 is a conceptual cross sectional view of a rotating logging tool comprising a unipole or dipole acoustic source operating at the same relatively high frequency. Assuming that anisotrophy is azimuthally symmetrical, the measured cross-over azimuthal segment $\Delta\theta_C$ defines the boundary between fast and slow formation 21a and 21b, respectively at an angle $\theta=45$ degrees with respect to a tool reference angle $\theta_R$. (see FIG. 2b). By combining this measurement with the response of the directional section 29 of the logging tool 20 (see FIG. 2A), the angle of the fast-slow boundary is referenced to an absolute reference angle $\Delta\theta_{ABS}$ which can be magnetic north, the "high" side of a deviated borehole, and the like.

It is apparent from the above illustrations and discussions that LWD unipole measurements made at higher frequencies (and likewise LWD dipole measurements made at the same frequency) can provide the slow and fast formation velocities with good accuracy in fast formations. The direction of minimum/maximum stress can be determined from these measurements by detecting the angle at which the velocity changes from fast to slow, which is defined as the cross-over angle. The direction of maximum stress is 45 degrees (relative to the tool reference angle) from the cross-over angle towards the slow velocity and the direction of minimum stress is 45 degrees.

Data Processing of Rotating Unipole and Dipole Logging Systems

Figure 14:
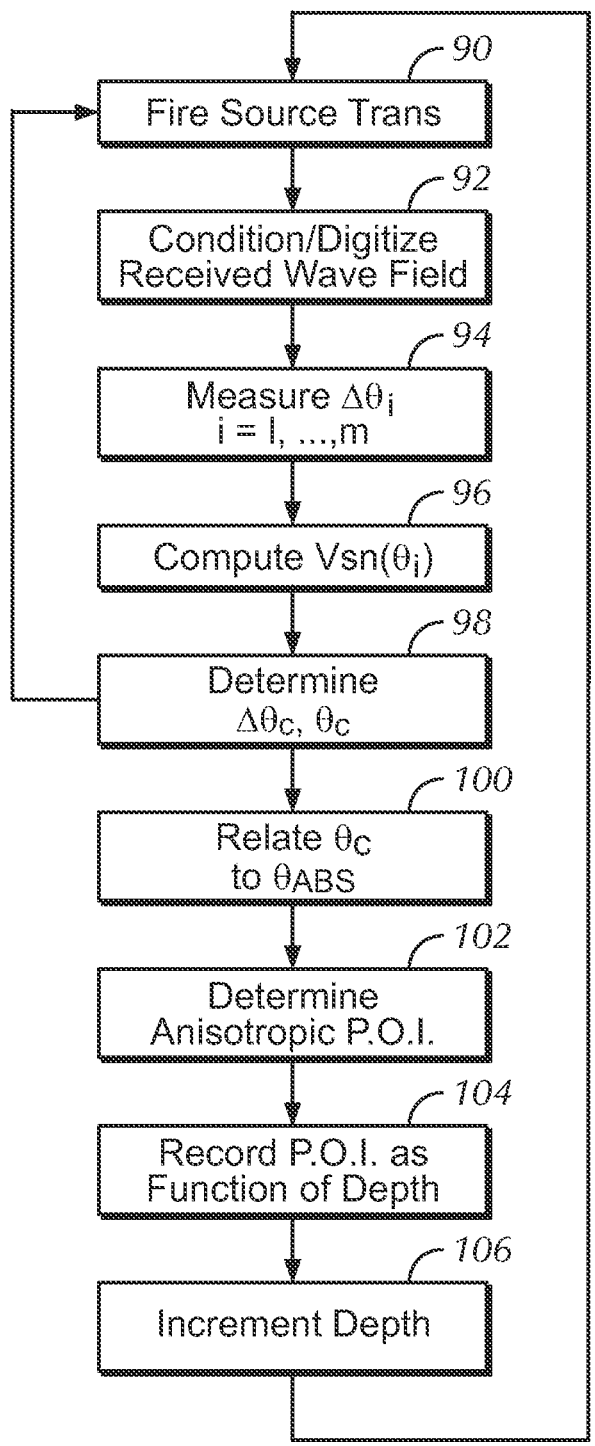
FIG. 14 summarizes the measurement and data processing steps in the form of a conceptual flow chart.

FIG. 14 summarizes the measurement and data processing methods in the form of a conceptual flow chart. Specific identifiers from FIGS. 2A, 2B and 13 are also referenced.

Again referring to FIG. 14, the acoustic source within the source section 23 is fired at step 90. The wave field generated by the acoustic pulse is received by plurality of detectors in the receiver section 24. These waveforms are digitized by a suitable analog to digital converter typically disposed within the instrument section 33 of the logging tool 20. These operations are indicated at step 92. Measured waveform data are partitioned at step 94 into azimuthal angle segments $\Delta\theta_i$ as the tool rotates within the borehole. At step 96, shear velocity is computed for each azimuthal angle segments $\Delta\theta_i$ as described in previous sections of this disclosure. A cross-over angle cross-over angle $\theta_C$, if present, is determined at step 98. Steps 90 through 98 are repeated for each source section-receiver section revolution within the borehole. For each revolution, the cross-over angle $\theta_C$ is related at step 100 to an absolute reference angle $\theta_{ABS}$ using output from a directional section 29. The absolute reference angle can be magnetic north, the high side of a deviated borehole, and the like. At step 102, anisotropic formation parameters and other parameters of interest (POI) using the previously described measured and computed data. Parameters of interest are recorded at step 104 as a function of depth. These parameters of interest can be recorded in memory disposed within the instrument section 33 for subsequent retrieval at the surface of the earth surface 40. Alternately, parameters of interest can be telemetered to the surface via the telemetry system 31, received by surface equipment 31, recorded in a surface recorder 38 which generates a "log" 39 of the parameters of interest as a function of depth. At step 106, depth is incremented and steps 90 through 104 are repeated thereby generating the log 39.

Summary

The measure of acoustic properties of anisotropic formations penetrated by a borehole can be summarized as follows: of material penetrated by a well borehole 1. Anisotropy measurements consist of three parts:
   (a) the measuring the slow and fast shear velocities of the formation;
   (b) the measuring the direction of the minimum/maximum stress; and
   (c) the measuring the ratio of anisotropy ratio by either measuring the ratio of the fast to slow slowness or their energies.
2. Wireline crossed-dipole shear measurements made at 2 KHz or less can provide all three anisotropy measurements. The same measurements can also be provided from a low-frequency dipole (rather than crossed-dipole) source, while rotating the wireline tool, by measuring the shear velocities as a function of rotational angle.
3. LWD unipole measurements made at higher frequencies can provide the slow and fast formation velocities with good accuracy in fast formations. The direction of minimum/maximum stress can be determined from these measurements by detecting the angle at which the velocity changes from fast to slow, which is defined as the cross-over angle. The direction of maximum stress is 45 degrees from the cross-over angle towards the slow velocity and the direction of minimum stress is 45 degrees from the cross-over angle towards the fast velocity.
4. Flexural modes generated from a unipole source can be used to measure anisotropy in slow formation after applying dispersion corrections.
5. LWD dipole measurements made at high frequency do not offer any advantage over unipole measurements made at the same frequency.

The above disclosure is to be regarded as illustrative and not restrictive, and the invention is limited only by the claims that follow.

What is claimed is:

1. An acoustic logging tool for determining an angular direction of minimum/maximum stress quantifying anisotropy of a formation penetrated by a borehole, said tool comprising:
    a unipole acoustic source; and
    a receiver section comprising a plurality of receiver stations at differing axial spacings from said acoustic source, wherein said source and said receiver section are configured to be synchronously rotatable within said borehole; and
    a processor configured to:
        measure responses of said receiver stations in azimuthal angular segments to refracted shear waves induced by said acoustic source;
        process said responses to determine shear velocities of said formation as a function of azimuthal angle; and
        determine said angular direction of minimum/maximum stress using said shear velocities as a function of said azimuthal angle.
2. The tool of claim 1 wherein:
    said shear velocities as a function of azimuthal angle are used to determine a cross-over angle; and
    said processor is further configured to combine said cross-over angle with measurements from a directional section of said tool to yield an absolute angular direction of said minimum/maximum stress.
3. The tool of claim 1 wherein said responses are processed with slowness time coherence maps and semblance projections or maximum likelihood method or slowness frequency coherence analysis.
4. The tool of claim 1 wherein said responses are processed with slowness time coherence maps and semblance projections.
5. The tool of claim 1 wherein said plurality of receiver stations comprises six or more receiver stations.
6. The tool of claim 1 wherein each said receiver station comprises two acoustic receivers.
7. The tool of claim 1 wherein said tool is a logging while drilling or measuring while drilling tool.
8. The tool of claim 7 wherein said source is operated at a frequency of approximately 4 KHz or greater.
9. The tool of claim 1 wherein said tool is a wireline tool.
10. The tool of 9 wherein said source is operated at a frequency of approximately 1 KHz or greater.
11. A method for determining a parameter quantifying anisotropy of a formation penetrated by a borehole, said method comprising:
    operating a unipole acoustic source to emit an acoustic signal;
    providing a receiver section comprising a plurality of receiver stations at differing axial spacings from said acoustic source;
    rotating said source section and said receiver section synchronously within said borehole;
    measuring responses of said receiver stations in azimuthal angular segments at a given depth within said borehole;
    processing said responses to determine shear velocity of said formation as a function of azimuthal angle at said depth;
    determining, from said shear velocity of said formation as a function of azimuthal angle at said depth, a relative angular direction of minimum/maximum stress of said formation; and
    combining said relative angular direction of minimum/maximum stress with a measure of tool orientation to obtain an absolute angular direction of said minimum/maximum stress.
12. The method of claim 11 wherein said responses are processed with slowness time coherence maps and semblance projections or maximum likelihood method or slowness frequency coherence analysis.
13. The method of claim 11 wherein said responses are processed with slowness time coherence maps and semblance projections.
14. The method of claim 11 wherein said plurality of receiver stations comprises six or more receiver stations.
15. The method of claim 11 wherein each said receiver station comprises two acoustic receivers.
16. The method of claim 11 further comprising conveying said source and said receiver section along said borehole with a drill string.
17. The method of claim 16 wherein said source is operated at a frequency of approximately 4 KHz or greater.

18. The method of claim 11 further comprising conveying said source section and said receiver section along said borehole with a wireline.

19. The method of claim 18 wherein said source is operated at a frequency of approximately 1 KHz or greater.

* * * * *